United States Patent
Satoh

[15] 3,650,294
[45] Mar. 21, 1972

[54] PRESSURE RETAINING VALVE

[72] Inventor: Kichiro Satoh, 29 Uguisudoni-machi, Tokyo, Japan

[22] Filed: Oct. 20, 1969

[21] Appl. No.: 867,444

[52] U.S. Cl............................137/509, 137/538, 137/543.23
[51] Int. Cl.................................................F16k 31/12
[58] Field of Search...................137/494, 509, 514.3, 514.5, 137/514.7, 538, 540, 543.23, 529, 514

[56] References Cited

UNITED STATES PATENTS

| | | | |
|---|---|---|---|
| 1,291,609 | 1/1919 | Nichols | 137/543.23 X |
| 1,631,142 | 6/1927 | Masters | 137/514.7 |
| 1,708,171 | 4/1929 | Halvorsen | 137/494 X |
| 1,789,388 | 1/1931 | McMillan | 137/514.7 X |
| 1,874,793 | 8/1932 | Nightingale et al. | 137/494 |
| 2,239,148 | 4/1941 | Ernst | 137/509 X |
| 2,410,375 | 10/1946 | Wright | 137/509 |
| 2,506,162 | 5/1950 | Metzgar | 137/514.7 |
| 2,748,947 | 6/1956 | Jay | 137/538 X |
| 2,767,726 | 10/1956 | Feucht | 137/494 X |

*Primary Examiner*—Samuel B. Rothberg
*Assistant Examiner*—David J. Zobkiw
*Attorney*—Holman & Stern

[57] ABSTRACT

A pressure retaining valve adapted to retain correctly any predetermined pressure of any fluid and serve as a safety valve which discharge the fluid to the second side for counter balance when the pressure of the fluid at the first side exceeds the predetermined pressure. The valve comprises a valve casing having an inlet and an outlet for fluid, a vertically disposed axial bore having stepped portions, and an uniquely shaped valve body fitted in the vertical bore, an adjustable spring loaded cylindrical member installed beneath the casing and connected to the vertical bore.

2 Claims, 3 Drawing Figures

PATENTED MAR 21 1972          3,650,294
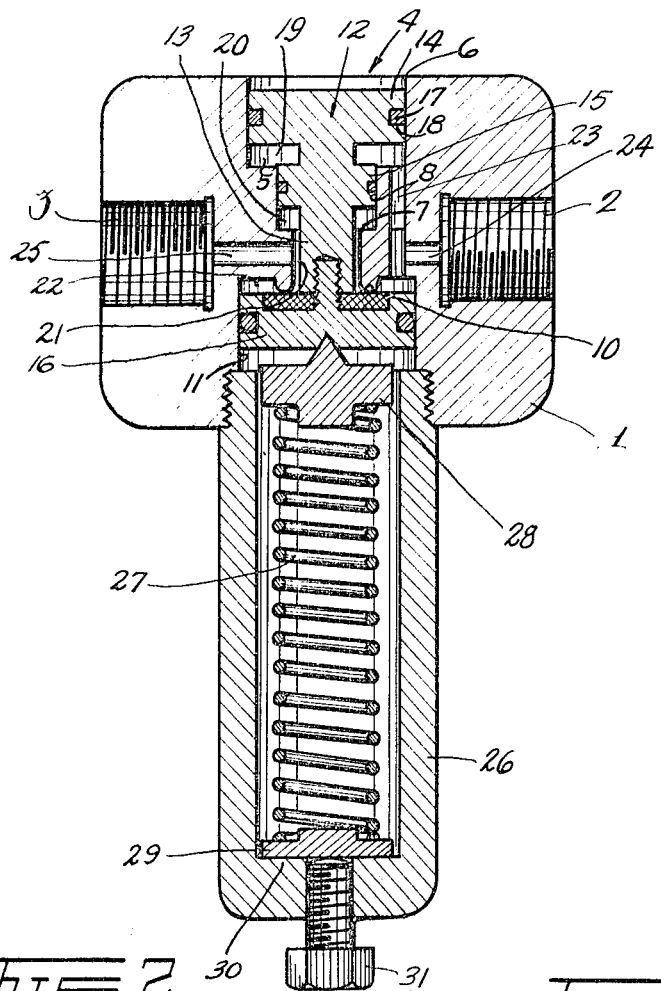
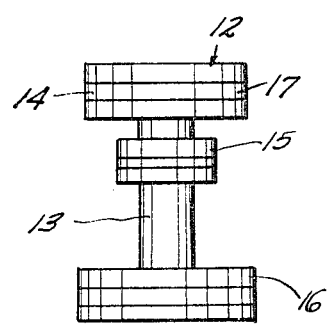
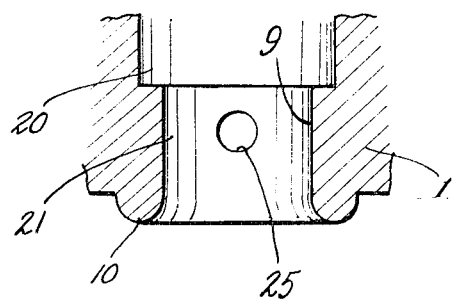
INVENTOR
KICHIRO SATOH
BY Holman, Glascock
Downing & Seebold
ATTORNEYS

PRESSURE RETAINING VALVE

THE BACKGROUND OF THE INVENTION

In the conventional pressure retaining valve or safety valve, once the fluid flows to other side, the valve and the valve seat displace from the settled position and cannot return to such position immediately when counter balanced. Accordingly, even though the fluid pressure reduces, the leakage of the fluid continues until the valve contacts to the valve seat and is positively pushed by the spring. Hence, the predetermined pressure would reduce. In other words, ordinary pressure retaining valves cannot always retain a predetermined pressure in the starting and closing of the valve operation. If the valve members are constructed so as not to be displaced by any fluctuation on increasing pressure at the first side in the fluid, the fluid pressure will always be retained with satisfactory conditions.

SUMMARY OF THE INVENTION

The present invention relates to a pressure retaining valve and more particularly, to a pressure retaining valve adapted to retain the pressure of the fluid at the first side to a predetermined pressure and serve as a safety valve which discharges the fluid to the second side to counter balance or adjust the overpressure when the pressure of the fluid at the first side exceeds the predetermined value of the pressure.

One object of the present invention is to provide a pressure retaining valve in which the valve construction is entirely free from any influence from the variation in pressure.

Another object of the present invention is to provide a safety valve in which the valve construction retain the predetermined pressure in the first side at any time.

These and other objects and features of this invention will be better understood by the following detailed description and the accompanying drawings.

BRIEF DESCRIPTION OF THE DRAWINGS

FIG. 1 is a vertical sectional view of an embodiment of the pressure-retaining valve constructed in accordance with the present invention.

FIG. 2 is a fragmentary perspective view on an enlarged scale of a valve body to be employed in the valve of FIG. 1; and FIG. 3 is a fragmentary perspective view on an enlarged scale of a pressure balancing chamber and a valve seat.

DETAILED DESCRIPTION OF THE INVENTION

Referring to the drawings in which a preferred form of a pressure retaining valve constructed in accordance with the present invention is illustrated, the valve comprises a valve casing 1 adapted to be arranged on a conducting tube by a fluid. An inlet 2 and an outlet 3 are arranged in the casing at diametrically opposite locations. The casing 1 is provided, in approximately the center thereof, with a vertically disposed axial bore 4 in which there is provided an upper annular shoulder or ledge 5 defining an upper cylinder 6. A second shoulder or ledge 7 is located axially below the shoulder 5 and defines an intermediate cylinder 8 of lesser diameter than the cylinder 6. Below the shoulder 7 is a third cylinder 9 of lesser diameter than the cylinder 8 and the lower end of the cylinder 9 is shaped to provide a valve seat 10. Inwardly of the valve seat 10 is provided a lower cylinder 11 of greater diameter than the cylinders 6, 8 and 9.

A valve body denoted generally 12 is positioned in the vertically disposed bore 6. More specifically, the valve body 12 includes a valve plunger 13 provided with upper, intermediate and lower heads or plates 14, 15 and 16, respectively. The diameters of the heads 14, 15 and 16 are such that such heads have a sliding fit within the cylinders 6, 8 and 11, respectively. A sealing means 17 is mounted in an annular groove 18 of each of the heads 14, 15 and 16 for the customary purpose.

It will be appreciated that the head 14, the shoulder 5 and the head 15 coact to define a guide chamber 19. The head 15 and the shoulder 7 cooperate to provide an overpressure balancing chamber 20 while the area between the upper surface of the head 16 above the seat 10 and the shoulder 7 constitutes an overpressure balancing chamber 21. Inwardly of the valve seat 10 and the upper surface of the head 16, there is provided a pressure indicating chamber 22.

A vertical passageway 23 is disposed between the guide chamber 19 and the pressure indicating chamber 22. An inlet passage 24 connects the vertical passageway 23 and the inlet 2 and is preferably located as close as possible to the chamber 22.

An outlet passage 25 provides communication between the outlet 3 and the overpressure balancing chamber 21.

It will be appreciated that the head 16 is adapted to seal the connection between the inlet 2 and the outlet 3 by closely engaging the valve seat 10 which has an area the same as that of the overpressure balancing chamber 21.

A cylinder 26 is attached to the center of the bottom of the valve casing 1 and communicates with the vertical bore 4. A coil spring 27 is disposed in the cylinder 26 and one end thereof urges an upper pusher 28 into contact with the bottom head 16 and the other end a bottom pusher 29 into contact with a cylinder bottom 30. An adjusting screw 31 threaded into the bottom of the cylinder 26 has its inner end in contact with the bottom pusher 29, whereby the pressure on the valve body 12 can be adjusted by proper manipulation of the adjusting screw 31.

The operation of the pressure retaining valve is as follows:

When the pressure on the inlet 2 (the first side) is kept at a predetermined pressure, the bottom head 16 contacts tightly the valve seat 10 by means of the coil spring 27 under the same pressure of the fluid at the predetermined pressure properly adjusted by the adjusting screw 31 and cut off the fluid connection between the inlet passage 24 and the outlet passage 25. If the pressure of the first side from the inlet 2 rises higher than the predetermined pressure, the pressure of the fluid flowing into the guide chamber 19 and the indicating chamber 22 through the inlet passage 24 and the vertical passageway 23 is also increased. As seen in FIG. 2, the diameter of the valve head 14 is less than that of the bottom valve head 16. Accordingly, when the bottom valve head 16 receives a higher pressure than the predetermined pressure at the first side, then, the bottom valve head 16 is pushed down against the force of the coil spring 27 and opens the valve seat 10, so that the fluid is discharged into the outlet side (second side) through the over pressure balancing chamber 21 and the outlet passage 25 until the overpressured fluid at the first side is decreased under the predetermined pressure. Upon the predetermined pressure being recovered at the first side, the valve body 12 moves downwardly and the valve seat 10 has an immediate, soft and tight contact with the bottom head 10 balancing with the force of the coil spring 27 to cut off the fluid connection between the inlet and the outlet, and to retain the constant pressure predetermined in the inlet passage 24 (the first side) accordingly.

In the conventional safety valve, once the valve is open and the fluid flows to the second side, the position of the valve and the valve seat displaces so that a considerable loss of the fluid pressure occurs until the valve and the valve seat contact closely. In the present invention, however, the overpressure balancing chambers 20 and 21 which connect to the outlet 3 are formed for retaining the pressure on the first side and on the over pressure balancing chamber 22, the head 15 is disposed and on the valve seat 10 beneath the overpressure chamber 21, the bottom head 16 is positioned. As seen in the FIG. 3, the area of the overpressure balancing chamber 20 is equal to the area of the inner portion of the thread 16 in the overpressure balancing chamber 21 that of the part which the back pressure coming out from the bottom head 10 operates. This construction protects the valve body 12 from any displacement regardless of the fluctuation in pressure. Further, through the vertical passageway 23, the fluid pressure at the first side can be affected onto the valve head 15 in the guide chamber 19 and onto the outer portion of the bottom head 16 in the pressure indicating chamber 22, and with the manual adjusting screw 31, the bottom head 16 can be adjustably disposed to keep a positive contact with the valve seat 10 at the set position in balancing the predetermined pressure of the fluid at the first time, with which a minimum loss or leakage of the fluid can be realized. In other words, in case the pressure is becoming higher than the predetermined value on the first side, the overpressure affects through the vertical passageway 23 on to the valve head 15 and the outer portion of the head 16 in the pressure indicating chamber 22.

Hence, the valve body 12 with the head 16 moves downwardly against the coil spring 27 and the head 16 is positioned away from the valve seat 10. Then, the fluid under overpressure is discharged to the outlet 25 through the over pressure balancing chambers 21 and 20, until the overpressure is counterbalanced or decreased to predetermined value.

It will be understood that the novel pressure retaining valve for fluid under predetermined pressure in the present invention insures instant and accurate operation with a minimum loss of leakage of the fluid.

What is claimed is:

1. A pressure retaining valve having a first side and a second side and adapted to retain a fluid under a predetermined pressure at the first side, comprising a valve casing having an inlet and an outlet, said casing further being provided with an axially extending bore, said bore being perpendicular to and between said inlet and said outlet, said bore having a first annular shoulder defining with the wall a first cylinder, a second annular shoulder spaced axially below the first shoulder and defining with the bore wall a second cylinder of lesser diameter than the first cylinder, a third cylinder of lesser diameter than the second cylinder below the second cylinder, a valve seat at the lower end of the third cylinder, and a fourth cylinder adjacent the valve seat having a diameter greater than the diameter of the first cylinder, a valve body positioned in said axial bore, said valve body including a plunger having axially spaced upper, intermediate and bottom heads positioned in said first, second and fourth cylinders, respectively, for sliding movement in the respective cylinders, said upper head and intermediate head coacting with said first shoulder and first cylinder wall to provide a guide chamber, said intermediate head, second shoulder, second cylinder wall and plunger coacting to provide a first overpressure balancing chamber, said bottom head, plunger and third cylinder wall coacting to provide a second overpressure balancing chamber, and said valve seat, bottom head and fourth cylinder wall coacting to provide a pressure indicating chamber, said casing having a first passage between the inlet and the pressure indicating chamber, and a second passage between the inlet and the guide chamber, said casing having a third passage between the outlet and the second overpressure balancing chamber, a cylindrical member located beneath the casing and connected to the axial bore, a spring loaded element within the cylindrical member operably related to said bottom head to urge said bottom head to contact said valve seat to seal the connection between the inlet and the outlet, the arrangement being such that upon the pressure at the inlet being kept at a predetermined pressure, the bottom head is maintained in tight contact with the valve seat by the spring loaded element, but upon pressure at the inlet rising higher than the predetermined pressure, the pressure of the fluid flowing into the guide chamber and pressure indicating chamber through the first passage and second passage is also increased so that when the bottom head receives a higher pressure than the predetermined pressure at the inlet, the bottom head is displaced away from the valve seat against the action of the spring loaded element allowing fluid to flow through the second overbalancing chamber, the third passage to the outlet until the overpressure fluid at the inlet is decreased or counterbalanced under the predetermined pressure.

2. The pressure retaining valve as set forth in claim 1, in which the area of the intermediate head in the first overpressure balancing chamber is equal to the area of the inner portion of the bottom head in the second overpressure balancing chamber.

* * * * *